Patented May 29, 1928.

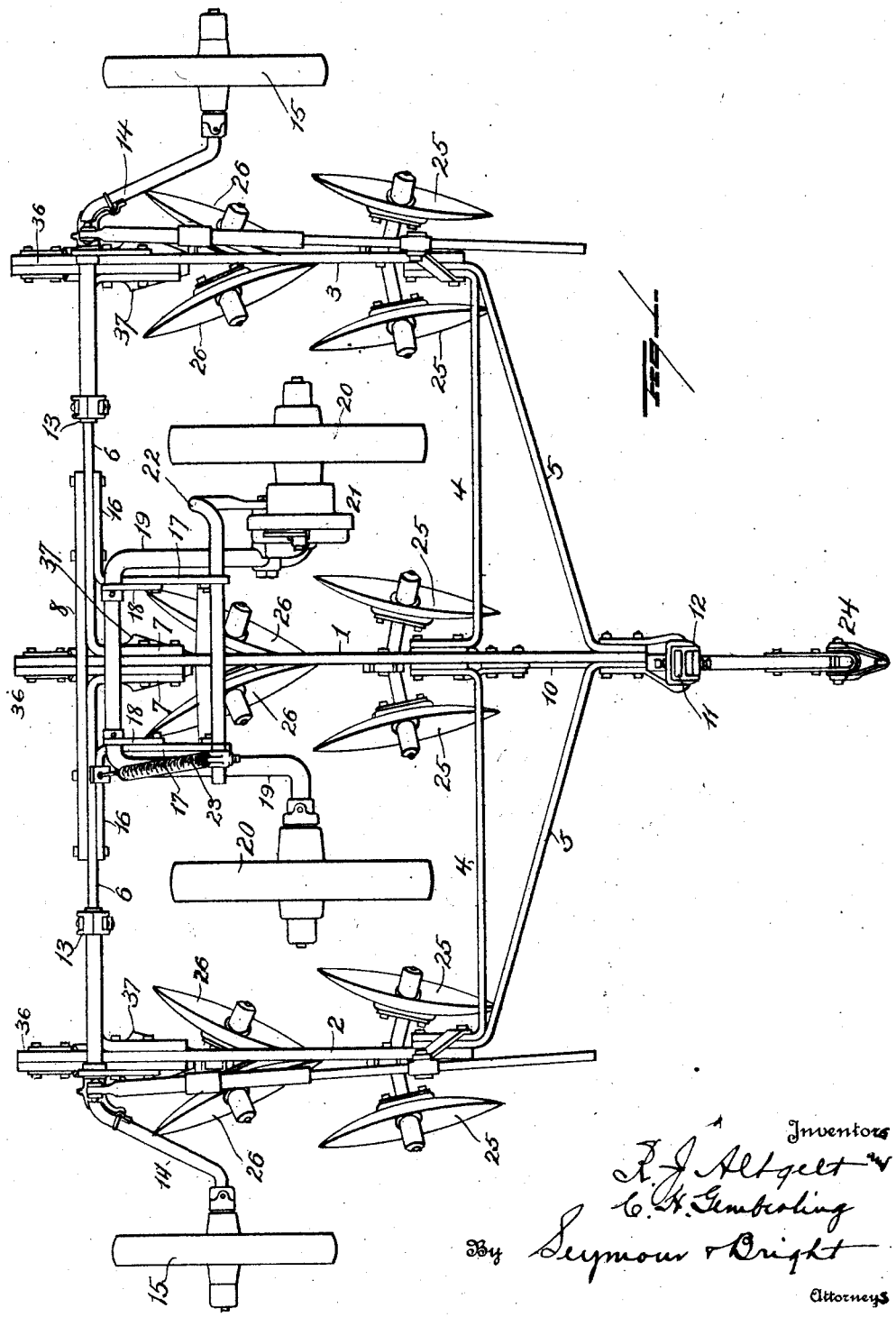

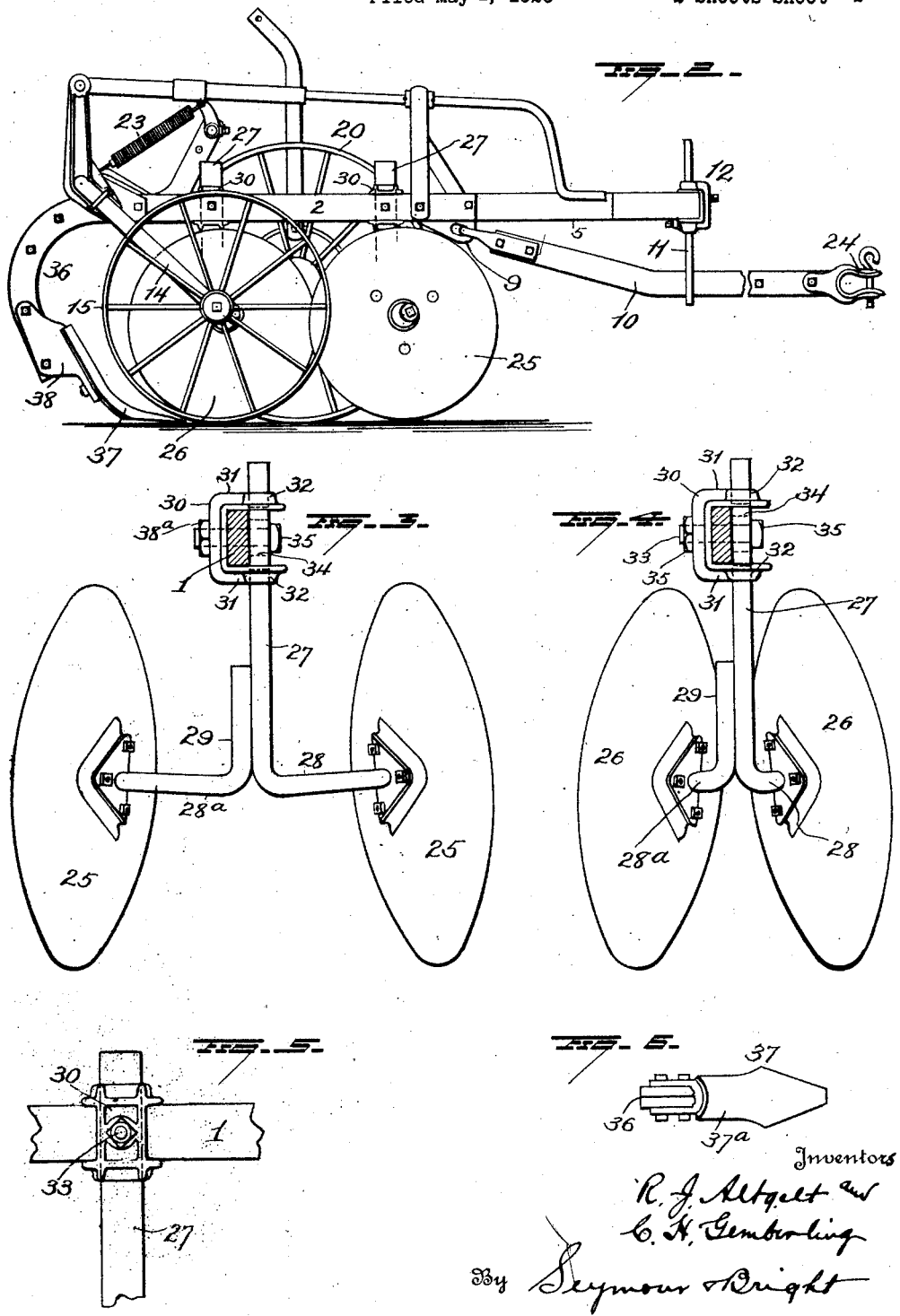

1,671,662

UNITED STATES PATENT OFFICE.

RUDOLPH J. ALTGELT AND CAMERON HONTZ GEMBERLING, OF SOUTH BEND, INDIANA, ASSIGNORS TO OLIVER CHILLED PLOW WORKS, OF SOUTH BEND, INDIANA.

PLOW.

Application filed May 1, 1926. Serial No. 106,036.

This invention relates to improvements in plows and has particular reference to such as are adapted for use in reducing ridges after the ground shall have been worked with the use of a lister plow.

One object of the present invention is to provide a plow structure of the type specified, with the use of which, ridges such as formed by a lister plow shall be effectually reduced and the ground left substantially level so as to provide an eminently suitable bed for planting operations.

A further object is to so construct an implement employing earth-working members of the disk type, that means shall be provided effectually to prevent slipping of the disk standards when the weight of the implement rests upon the disks, said means also serving to provide for vertical adjustment of the disks.

With these and other objects in view, the invention consists in certain novel features of construction and combinations of parts as hereinafter set forth and pointed out in the claims.

In the accompanying drawings,—

Figure 1 is a plan view of an implement showing an embodiment of the invention.

Figure 2 is a view in side elevation, and

Figures 3 and 4 are enlarged detail views, partly in section, and

Figures 5 and 6 are views showing details.

The frame of the implement includes a plurality of beams 1, 2 and 3 suitably spaced apart; front braces 4, 4, secured at their outer ends to the side beams 2, 3; converging forward braces 5, 5, secured at their outer ends to the side beams 2, 3, and at their inner ends to the forwardly projecting portion of the center beam 1, and rear brace or frame members 6, 6, which extend from the side beams 2, 3, and terminate at their inner ends in forwardly projecting arms 7, 7, which are secured to the rear portion of the center beam 1. The rear frame members 6 may be connected by a brace 8. A bracket 9 is secured to the center beam 1 rearwardly of the forward end of the latter and with this bracket, the rear end of a draft bar 10 is loosely connected,—this draft bar being supported between its ends by means of a member 11 supported by and adjustably connected with the forward portion of the beam 1 as indicated at 12. The rear frame members 6 support bearings 13 for crank-axle members 14 which project laterally from respective sides of the frame and are provided with suitable spindle portions at their outer ends to enter the hubs of carrying wheels 15. Brackets 16 are secured to the frame members 6 and are provided with arms 17 which project forwardly at respective sides of but spaced from the central beam 1 and to these brackets, bearings 18 for a centrally located crank-axle 19 are secured. The crank axle 19 is provided with suitable spindle portions entering the hubs of wheels 20 located within the frame between the central beam 1 and the respective side beams 2 and 3. One of the wheels 20 is connected with the frame through the medium of power lift mechanism including clutch devices indicated at 21 and a lifting arm 22 connected with the forwardly projecting arms 17 of the brackets 16. If desired a spring 23 may be connected at one end with the lifting arm and at the other end with the frame.

Suitable clevis or hitch devices 24 will be provided at the forward end of the draft bar for connecting the implement with a tractor.

With each of the beams 1, 2 and 3, forward and rearward pairs of earth working disks 25 and 26 are connected,—the disks of the forward pair being spaced further apart and further from the beam than are the disks of the rear pairs. In effecting the connections for the disks to the beams, standards 27 are provided, the lower end of each standard being provided with a laterally projecting arm 28 on which one disk of each pair is mounted. An angle bar 29 is securely riveted to each standard and the laterally projecting portion of said angle bar constitutes an arm 28ª on which the other disk of a pair is mounted.

In securing each standard 27 to a beam, we employ a clamping yoke 30 which embraces the beam and its parallel arms 31 are made with alined openings 32 through which the standard 27 passes. A bolt 33 passes through the body portion of each clamping yoke, through the beam which said yoke engages, and through one of a series of holes 34 in the standard,—said bolt having a head 35 at one end and a nut 35ª on the other end. With such construction, slipping of the disk standards will be effectually prevented when the weight of the implement is resting upon the disks and furthermore the connections between the disk standards and the beams afford efficient means for vertical adjustments of the disks.

Each of the beams 1, 2 and 3 is provided at its rear end with a standard portion 36 to which a point or tongue 37 is secured. This point or tongue consists of an approximately flat plate made somewhat tapering from near its central portion to its forward end and may be slightly convex. The upwardly extending shank portion 37<sup>a</sup> of the point or tongue 37 may be convexed somewhat and is seated on and adjustably secured to a bracket 38, the latter being secured to the beam standard.

The general construction and arrangement of the framework including the beams 1, 2 and 3 and the means for supporting this framework on wheels are similar to the construction and arrangement disclosed in application for patent filed in the names of Rudolph J. and Herman E. Altgelt on the 11th day of February 1926 and designated by Serial No. 87,618 for a plow structure of the three row lister type.

When a lister plow is used, furrows are made and intermediate ridges formed. It is the purpose of the present invention to break down or reduce such ridges and leave the soil substantially level to provide a proper bed for planting operations. After the listing operation with the use of the plow disclosed in the application above identified, such lister plow may be converted into a "ridge burster" by applying to its beams the pairs of disks disposed as hereinbefore described and substituting for the middle-breaker plow bases of the lister plow, the approximately flat plates or tongues 37 herein shown and described. With such a construction, the forward pairs of disks will remove portions of the ridges and the rear pairs of disks will remove other portions of the ridges and leave a very slight ridge of soil which will be leveled by the plates or tongues 37, thus leaving a flat and substantially level seed bed.

Having fully described our invention what we claim as new and desire to secure by Letters Patent, is:—

1. In a plow structure of the character described, the combination with a wheeled frame including a beam, of forward and rear standards secured to and depending from the beam, pairs of earth working disks carried by the lower ends of the standards, the disks of the forward pair being spaced farther apart than the disks of the rear pair, and a point or tongue secured to the rear end of the beam, the point being approximately flat longitudinally and convex transversely.

2. In a plow structure of the character described, the combination with a wheeled frame including a plurality of beams spaced apart and each having a standard portion at its rear end and cross braces rigidly secured to the beams and maintaining them in parallel relation, of a bracket secured to the standard portion of each beam, a transversely convex longitudinally flat point or tongue secured to each bracket, a pair of diagonally disposed earth working disks supported by and under each beam in advance of said point or tongue, and a pair of disks supported by each beam in advance of the first mentioned pair of disks and spaced farther apart than are the disks of said first mentioned pair.

3. In an agricultural implement, the combination with a wheeled frame including a beam, of a standard having laterally extending rigid arms at its lower end, earth working disks carried by said arms, and means for adjustably locking the standard to the beam.

4. In an agricultural implement, the combination with a beam and earth working disks, of a standard having an integral lateral arm at its lower end, a second arm rigidly united with the standard and extending away from the integral arm, said arms carrying said disks, and means locking said standard to the beam.

5. In an agricultural implement, the combination of a beam, earth working disks, a standard having a plurality of holes through its upper portion and provided at its lower end with arms connected with said disks, a yoke embracing the beam and having openings through which the standard passes, and a bolt passing through the body of said yoke, the beam and one of the series of holes in the standard.

In testimony whereof, we have signed this specification.

RUDOLPH J. ALTGELT.
CAMERON HONTZ GEMBERLING.